United States Patent [19] [11] 4,281,589
Stoll [45] Aug. 4, 1981

[54] WORKING CYLINDER FOR PNEUMATIC OR HYDRAULIC PRESSURE MEDIA

[76] Inventor: Kurt Stoll, Lenzhalde 72, 7300 Esslingen, Fed. Rep. of Germany

[21] Appl. No.: 72,864

[22] Filed: Sep. 6, 1979

Related U.S. Application Data

[63] Continuation of Ser. No. 826,001, Aug. 19, 1977, abandoned.

[30] Foreign Application Priority Data

Aug. 21, 1976 [DE] Fed. Rep. of Germany ....... 2637803

[51] Int. Cl.³ .............................................. F16J 15/16
[52] U.S. Cl. .................................... 92/109; 92/98 D; 92/165 R
[58] Field of Search .................. 92/83, 98 D, 105, 108, 92/109, 107, 168, 113, 165 R; 74/18.2

[56] References Cited

U.S. PATENT DOCUMENTS

| 1,239,869 | 9/1917 | Block | 92/107 |
| 2,692,618 | 10/1954 | Ludowici | 92/98 D |
| 2,702,023 | 2/1955 | Seeloff | 92/195 R |
| 2,730,995 | 1/1956 | Seeloff | 92/98 D |
| 3,244,013 | 4/1966 | Deschner | 74/18.2 |
| 3,559,540 | 2/1971 | Sheldon | 92/163 |
| 3,673,927 | 7/1972 | Fluhr | 92/98 D |
| 4,024,770 | 5/1977 | Liesenborghs | 92/98 D |

FOREIGN PATENT DOCUMENTS 421775 3/1974 U.S.S.R. .................................. 92/98 D

Primary Examiner—Abraham Hershkovitz
Attorney, Agent, or Firm—Blanchard, Flynn, Thiel, Boutell & Tanis

[57] ABSTRACT

A working cylinder for pneumatic or hydraulic pressure media for producing a rectilinear operating movement. The working cylinder has at least one operating chamber which receives the pressure medium and includes one stationary rigid housing part which preferably has the medium feed inlet thereon and a movable rigid piston part, both of which are interconnected pressure-tight by an elastically deformable envelope device and are guided together. The envelope device is constructed as a rolling-bellow diaphragm and is substantially closed all around and defines the operating chamber which receives the pressure medium.

1 Claim, 4 Drawing Figures

WORKING CYLINDER FOR PNEUMATIC OR HYDRAULIC PRESSURE MEDIA

This is a continuation of application Ser. No. 826,001, filed Aug. 19, 1977, now abandoned.

FIELD OF THE INVENTION

The invention relates to a working cylinder for pneumatic or hydraulic pressure media for carrying out a rectilinear operating movement, comprising at least one operating chamber which receives the pressure medium and comprising a stationary rigid part or housing which has preferably the medium feed inlet and a movable rigid part or piston, both of which are interconnected pressure-tight by an elastically deformable envelope device and are guided together.

BACKGROUND OF THE INVENTION

A first purpose of the present invention consists in improving conventional working cylinders of the type herein discussed so that the sealing of the operating chamber is secure in a simple manner and independent from the quality and exactness of the manufactured components.

To attain this purpose, the invention provides that the envelope device which is constructed preferably as a rolling-bellow diaphragm is constructed as an envelope which is closed substantially on all sides and defines the operating chamber which receives the pressure medium.

Thus the envelope device can be constructed already during the manufacture process as a uniform, closed hollow member, which has the advantage that later seals or pressure-tight connections between the rigid parts are not needed. The envelope device can thereby be formed corresponding with the contour of the rigid parts and can be inserted in these and/or can be placed over same. The envelope device needs only still to be attached to the rigid parts, in order to secure it against a possible slipping.

In the preferred exemplary embodiments, an advantage results that a compact and small working cylinder is obtained.

The invention furthermore has the purpose to produce a modification in which the cylinder can be utilized as a double loadable working cylinder without a substantially more complicated structure. The pressure-tight separation is formed in this case in a simple manner by the elastic-deformable envelope device, which assures an absolute seal over a long period of time, because between the sealing envelope device and the rigid parts there does not take place substantially any relative movement which effects a drive. The envelope device is only rolled onto or from the respective sealing surface on the rigid part.

BRIEF DESCRIPTION OF THE DRAWINGS

Further details and developments of the invention can be taken from the following description, in which the invention is described and discussed more in detail with reference to the exemplary embodiments illustrated in the drawings, in which.

DETAILED DESCRIPTION

Figure 1:
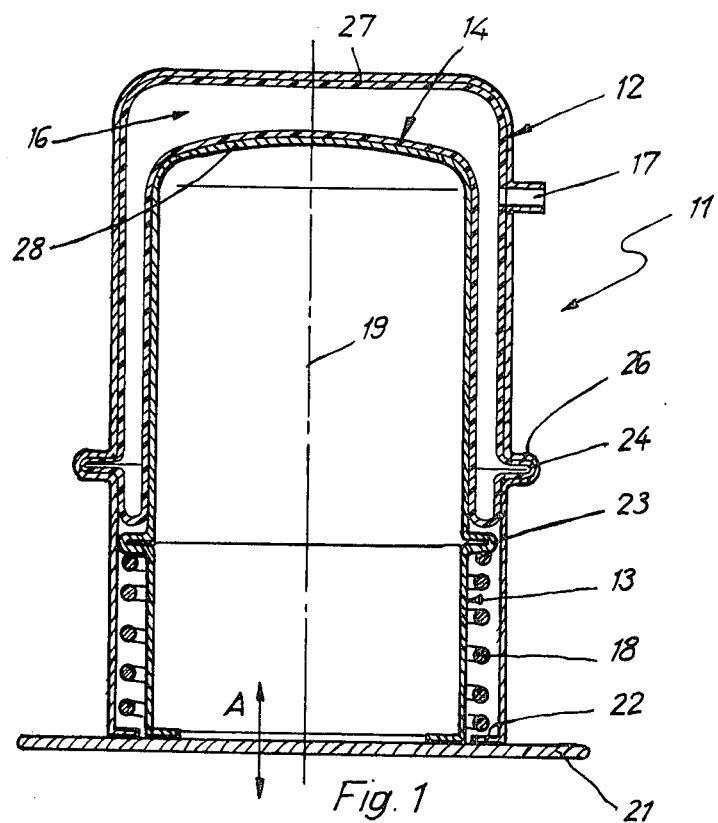
FIG. 1 is a schematic central longitudinal cross-sectional view of a working cylinder according to a first exemplary embodiment of the present invention.
Figure 2:
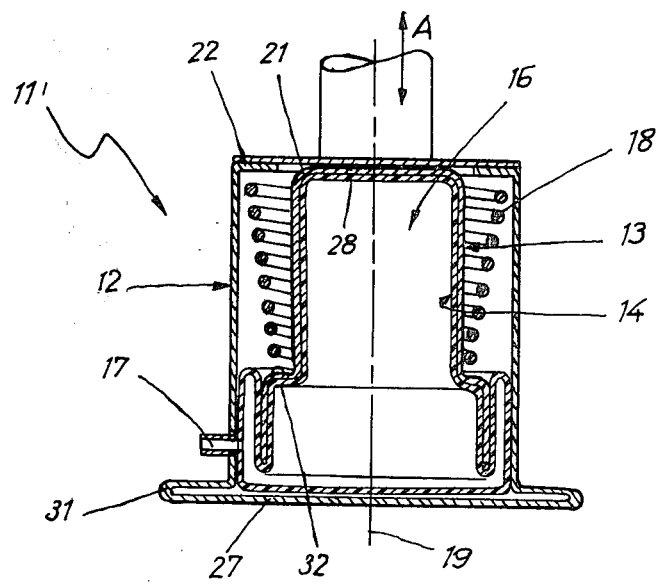
FIG. 2 is a central longitudinal cross-sectional view of a working cylinder according to a second exemplary embodiment of the present invention.

The working cylinders 11 or 11' which are illustrated in FIGS. 1 and 2 can be loaded on one side thereof by a pneumatic or hydraulic pressure medium for producing a rectilinear operating movement. The working cylinders 11 and 11' both include a rigid stationary housing 12, a rigid piston 13 which can be moved rectilinearly back and forth in direction of the double arrow A and an elastically flexible or deformable envelope 14 which has the form of an envelope closed on all sides and defines an operating chamber 16 for receiving the respective pressure medium and which is arranged between the housing 12 and piston 13. The peripheral length or surface of the envelope 14 at all times remains the same size and is manufactured for example of rubber or a suitable plastic. In both exemplary embodiments, the stationary housing 12 is provided with at least one schematically illustrated short feed pipe 17 for supplying and exhausting the respective pressure medium. Furthermore, the housing 12 and piston 13 are initally urged toward one another by means of a helical pressure spring 18 to compress the envelope 14 and cause the working cylinders 11 and 11' to return to the initial position upon removal of the pressure of the respective pressure medium. Both working cylinders 11, 11' are, aside from the short feed pipe 17, substantially cylindrical with respect to the longitudinal axis 19.

In the exemplary embodiment which is illustrated in FIG. 1 the movable piston 13 has a hood or pot-shape and is welded or otherwise secured at its open end to a cover plate 21. The stationary housing 12 is also pot or hood-shaped and is positioned over the movable piston 13 so that in the one pressureless end position, which is illustrated in FIG. 1, a generally cup-shaped operating chamber 16 is formed which chamber 16 is U-shaped in cross section. The housing 12 has an inwardly bent lower edge 22 and the piston 13 has an outwardly projecting rim 23. A cylindrical pressure spring 18 is positioned between and engages the edge 22 and the rim 23 and is concentrically arranged with respect thereto. The housing 12 and piston 13 are also concentrically related. The pressure spring can be, if desired, slightly initially tensioned. The housing 12 has in an area above the pressure spring 18 an annular recess 24 which opens inwardly and receives an annular thickened portion 26 of the envelope 14 therein and is clamped or otherwise secured therein. The thickened portion 26 can also be formed when the envelope 14 consists of two parts each having outwardly bent rims connected in a pressure-tight manner. The envelope 14 is formed such that it snuggly engages the inside of the housing 12 and the outside of the movable piston 13 in the pressureless end position which is illustrated in FIG. 1. It is preferable if the envelope is secured at least to the respective bases 27 and 28 of the housing 12 and the piston 13 for example by means of an adhesive or the like. The envelope 14 engages the walls of the housing 12 and piston 13 substantially to the height of the upper end of the pressure spring 18. It is understood that the short feed pipe 17 includes a pressure-tight opening through the envelope 14. The envelope 14 is thus also in this area preferably adhesively connected to the housing 12.

If now a pressure medium is introduced into the operating chamber 16, the movable piston 13 moves against the action of the pressure spring 18 to carry out a rectilinear operating movement downwardly according to FIG. 1 and the elastically deformable envelope 14 with its cylindrical side area rolls partly off the outer periphery of the movable piston 13 and rolls onto the inner periphery of the housing 12 at an approximately corresponding length. The operating chamber 16, which enlarges accordingly in its effective inside volume, is thus completely defined by the envelope 14 and is deformed corresponding with the possible relative movement of the parts 12 and 13 which are guided together. Due to the envelope 14 being closed and pressure-tight all around, a special sealing of the operating chamber 16, as this must generally be the case in piston-cylinder-units, is not necessary.

In the exemplary embodiment which is illustrated in FIG. 2 and which is rotated at 180°, the housing 12 is also hood-shaped and is formed in one piece of plastic having a base 27 and a projecting rim 31 or is for example bent of sheet metal. The movable piston 13 is arranged differently than in the exemplary embodiment of FIG. 1 within the housing 12 in that the two bases 27 and 28 do not face one another. The movable piston 13 thus projects with its open end into the housing 12 and this area is curved outwardly by forming a shoulder 32 such that between the cylindrical area of the open end of the movable piston 13 and the area of the housing 12 concentrically surrounding the piston 13, there exists a clearance which is slightly larger than twice the wall thickness of the utilized envelope 14. A pressure spring is also arranged between the two parts 12 and 13, which pressure spring, however, is not cylindrical but conical and the end having the smaller diameter rests on the shoulder 32 while the end having the larger diameter is supported on the bent rim 22 of the housing 12. In this manner, the arrangement can be more compact, because the spring wire of the pressure spring 18 can telescope into one another during compression. In the pressureless end position which is illustrated in FIG. 2, the pressure-tight envelope 14 is secured at least to the base 27, 28 of the parts 12 and 13, for example by an adhesive, and lies in the axially spaced area between the small end of the pressure spring 18 and the base 27 of the housing 12 and is generally S-shaped between the inner wall of the housing 12 and the outer and inner wall surfaces of the movable piston 13. If the pressure medium is introduced into the short feed pipe 17 adjacent the rim 31 of the housing 12 and the S-shaped portion of the envelope 14 to pressurize the interior of the envelope, then the piston 13 moves upwardly against the action of the pressure spring 18 according to FIG. 2 to cause the S-shaped area of the envelope 14 to be extended or rather pulled apart because the substantially approximately cylindrical operating chamber 16 is extended in direction of its longitudinal axis 19. The fastening and the elastically deformable or flexible construction of the envelope 14 causes the envelope 14 to return the S-shape after the pressure is removed therefrom to its initial condition.

Figure 3:
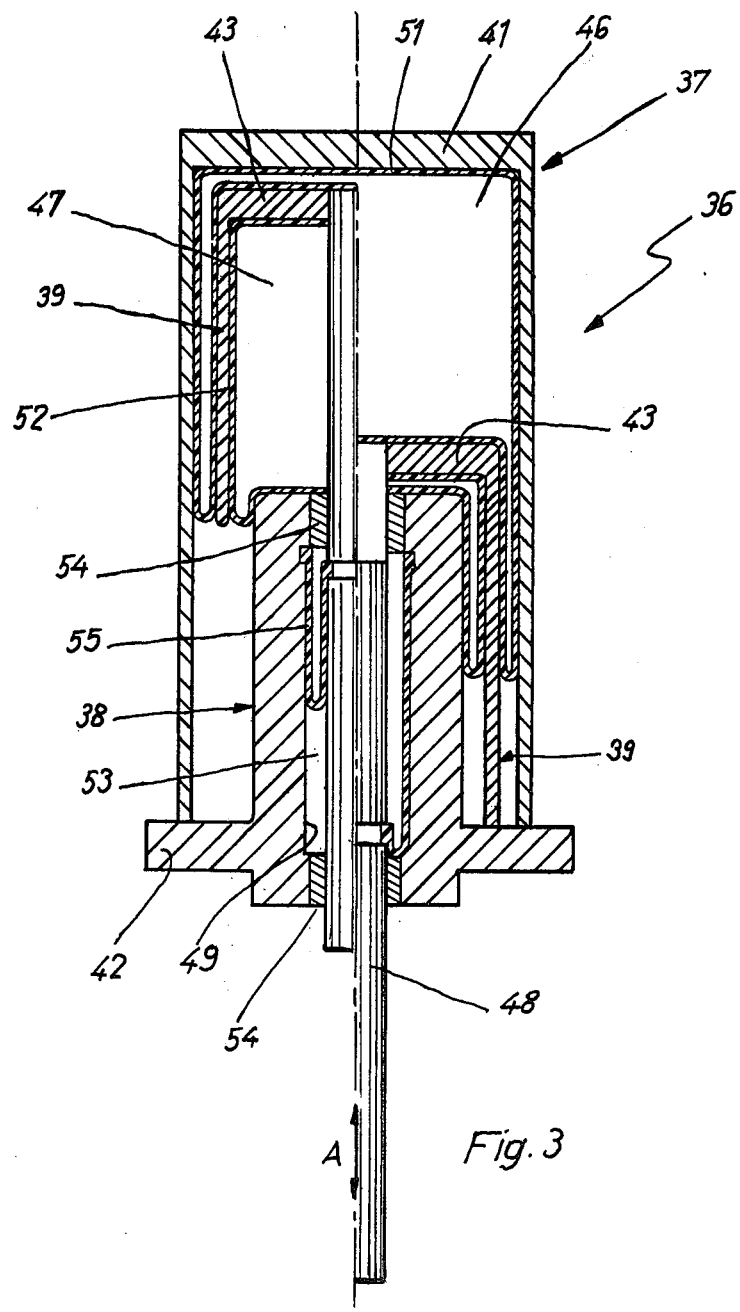
FIG. 3 is a central longitudinal cross-sectional view which illustrates both end positions of a double loadable working cylinder according to a third exemplary embodiment of the present invention.
Figure 4:
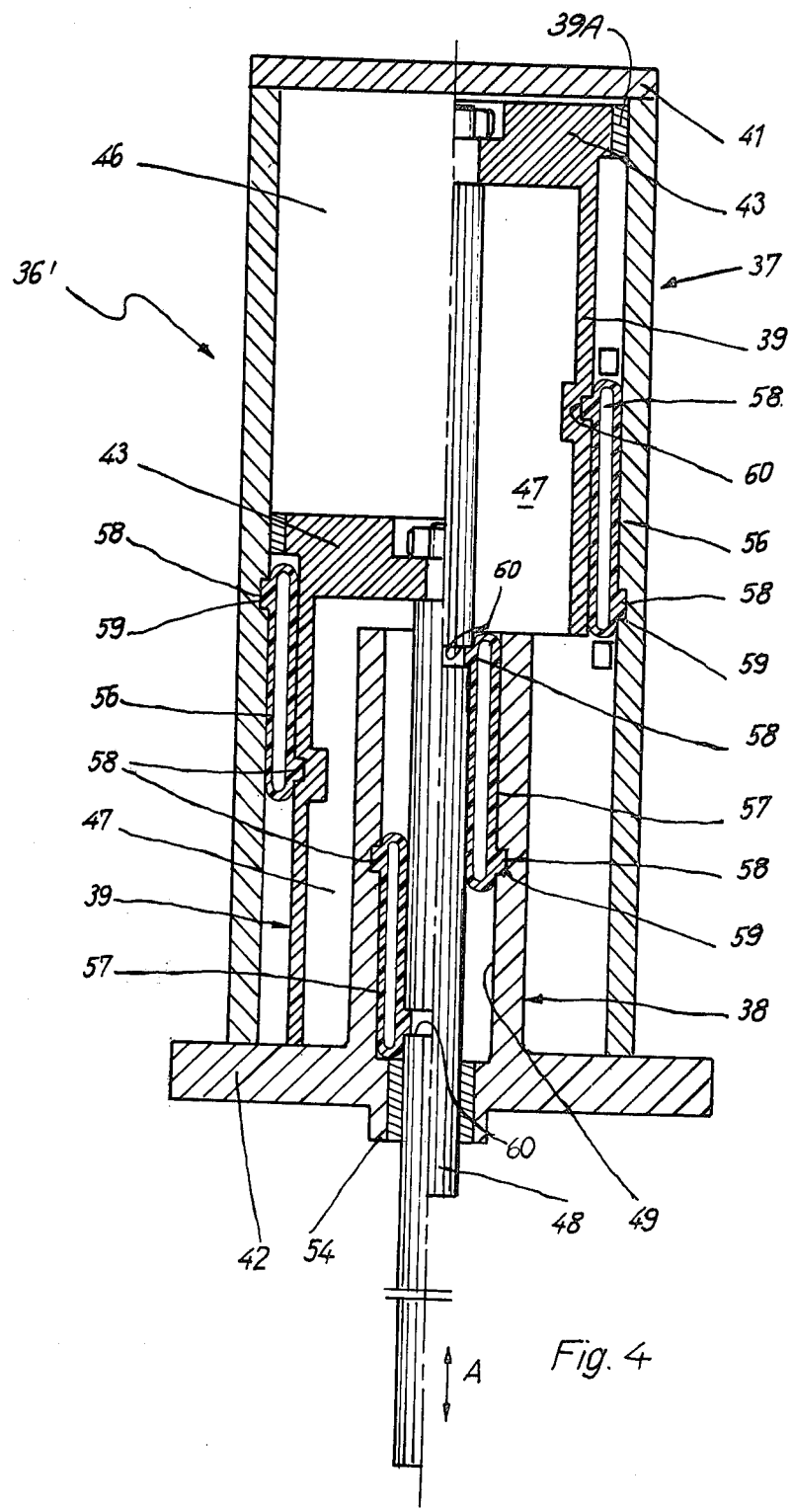
FIG. 4 is a central longitudinal cross-sectional view similar to FIG. 3, however, of a double loadable working cylinder according to a fourth exemplary embodiment of the present invention.

FIGS. 3 and 4 illustrate each a double loadable working cylinders 36 and 36', respectively for a pneumatic or hydraulic pressure medium for producing a rectilinear operating movement. The working cylinders 36 and 36' have two stationary housings 37 and 38 which are arranged concentrically to one another and between which a part 39, which is concentrically arranged between the two stationary parts, is movable back and forth according to the double arrow A. The outer stationary rigid part 37 is pot or hood-shaped, thus cylindrical shaped having a base 41 and an opened end spaced therefrom. On the cylinder is placed a cover plate 42 which is integrally formed with the rigid, stationary, inner part 38 projecting into the outer part 37. The inner part 38 projects approximately into the center of the outer part 37. The movable rigid part 39 which is arranged within the outer part 37 is also pot or hood-shaped, thus is also constructed as a cylinder and has a base 43 and is arranged such that its base 43 faces the base 41 of the outer part 37. The movable part 39 can thus be moved according to the double arrow A from a position, in which its base 43 almost rests on the base 41, into a position, in which it substantially completely covers or encircles the inner part 38, and back again. Two operating chambers 46 and 47 are formed between the movable part 39 and the outer part 37 or between the movable part 39 and the inner part 38. The movable part 39 is connected at its base 43 to a rod 48 which is coaxial with the longitudinal axis 19 and extends through a cylindrical opening 49 in the inner part 39 and the cover plate 42. The connections which communicate with the operating chambers 46, 47 for the alternate supplying of pressure medium are omitted in the drawings: they can be provided for example in the base 41 of the outer rigid part 37 for the chamber 46 and in the rod 48, from which the connection can communicate below the base 43 of the movable part 39 in the chamber 47. The connections can also facilitate simultaneously for the exhaust of pressure medium.

In the exemplary embodiment of the double loadable working cylinder 36 illustrated in FIG. 3, the operating chambers 46, 47 are each formed and defined by an envelope 51 and 52 made of rubber or a suitable plastic, which envelope is constructed as an entirely closed pressure-tight structure and is elastically flexible or deformable. The first or outermost envelope is thereby arranged such that between the movable part 39 and the outer stationary part 37, the outermost envelope engages the inside of the outer part 37 and the outside of the movable part 39 and is secured to their bases 43, 41 by an adhesive. The second or inner envelope 52 engages the inside of the movable part 39 and the outside and base of the inner stationary part 38 and is secured to the bases of the movable part 39 and on the inner part 38 by an adhesive. As one can take from the two half cross sections of FIG. 3, which illustrate the two end positions, the two operating chambers 46, 47 are each alternately approximately U-shaped in cross section or approximately rectangular in cross section. In the pressureless end position, the envelopes 46, 47 extend between areas which lie close together, like base and cylinder part, of the rigid and movable parts 37 to 39. An annular space is provided between the rod 48 and the inside of the cylindrical inner part 38 and between the axially spaced low friction bearings 54 for the rod 48. A ring-shaped, elastic-flexible sleeve 55 is mounted in the annular space with one end thereof being held pressure-tight near the upper bearing 54 on the inner part 38 and the other end being held pressure-tight on the rod 48. The ends of the sleeve can be held for example by forming the ends into a thickened portion and clamping same into a groove or the like. As can be taken from FIG. 3, the sleeve 55 assumes in the one position a U-shape and in the other position an I-shape (viewed in half cross section). In this manner, a sealing of the inner operating chamber 47 is provided and without requiring the bearings 54 to be made pressure-tight.

The double loadable working cylinder 36' is illustrated in FIG. 4 and differs from the exemplary embodiment illustrated in FIG. 3 substantially by the differently constructed pressure-tight separation of the two operating chambers 46 and 47. The outer operating chamber 46 is formed between the base 43 of the movable part 39 and is guided on the cylindrical inner sidewalls of the outer stationary part 37, and the respective areas of the outer part 37 and is approximately rectangular in cross section, while the inner operating chamber 47 is formed between the inner wall of the movable part 39 and the outer wall of the inner stationary part 38. The inner operating chamber assumes either a configuration which is rectangular in cross section or substantially U-shaped in cross section. A pair of hollow ring-shaped envelopes 56 and 57 effects a sealing off of the operating chambers 46 and 47 and are also elastically flexible and elastically deformable. The outer annular envelope 56 is arranged between the cylindrical outer wall of the movable part 39 and the cylindrical inner wall of the outer stationary part 37 and the inner annular envelope 57 is arranged between the cylindrical inner wall of the inner stationary part 38 and the rod 58 which is connected to the movable part 39. The annular envelopes 56, 57 which in half cross section have approximately an oval shape, have at two diagonally spaced locations an upper and a lower rib 58 inserted and held, if desired clamped, in a corresponding annular recesses 59 on the stationary parts 37, 38 and the movable part 39 and the recesses 60 on the rod 48. As can be seen from FIG. 4, the annular envelopes 56, 57 roll during transfer of the movable part 39 from its one end position into its other end position along the wall of the one part and rests in a corresponding length on the wall of the other part.

Since the movable part 39 has a low friction bearing member 39A thereon which is guided on the inner surface of the outer part 37, it is sufficient when the rod 48 is guided on a bearing 54 in the area of the cover plate 42.

In the case of the two working cylinders 36, 36' which are illustrated in FIGS. 3 and 4 and in the case of the one-sided loadable working cylinders 11 or 11' which are illustrated in FIGS. 1 and 2, sealing of the respective operating chambers is assured in a simple manner by deformable envelopes or sleeves and the wear of parts which rub against one another and which move relative to one another in the area of the seal is avoided. In the illustrated exemplary embodiments, the elastic-flexible envelopes or sleeves are each manufactured of a suitable plastic or of a rubber. The envelopes or sleeves can be preformed corresponding to the shape of the stationary or movable part at least in the area in which it is secured to same. The stationary and movable parts of the working cylinders can be manufactured of metal or a suitable plastic.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A power cylinder, comprising:

elongated and hollow housing means having a pair of end walls and a uniform inner diameter between said end walls, one of said end walls having an opening therethrough and an axially extending hollow inner part concentric and partially coextensive with said housing means and terminating intermediate said end walls, said hollow inner part being axially aligned with said opening, a substantial first annular space being provided between the inner wall of said housing means and the outer wall of said inner part;

a piston movably supported in said housing means between the other of said end walls and the terminal end of said inner part, said piston dividing the interior of said housing into a pair of operating chambers and having a hollow shell extending axially therefrom and in a spaced relation from said inner wall of said housing means, said hollow shell being movable with said piston into and out of said first annular space, said first annular space constituting one of said operating chambers, the spacing between said piston and said other end wall constituting the other of said operating chambers;

a piston rod fixedly secured to said piston and extending axially concentric with said shell out through said opening in said one end wall;

a first annular rolling sealing member positioned between the outer wall of said shell on said piston and said inner wall of said housing means to effectively seal said two operating chambers from each other, said first annular rolling sealing member comprising a first endless hollow sleeve, one part thereof being secured to said inner wall of said housing means and another part thereof secured to said outer wall of said shell;

a second annular rolling sealing member positioned between the inner wall of said inner part and the exterior of said piston rod to effectively seal said one operating chamber to the exterior of said housing means, said second annular rolling sealing member comprising a second endless hollow sleeve, one part thereof being secured to said inner wall of said inner part and another part secured to said piston rod; and at least a pair of axially spaced low friction and non-pressure-tight bearing means operatively centering said piston in said housing means and said piston rod in said opening through said inner part said first and second annular rolling sealing members being located between said axially spaced bearing means, said pair of low friction bearing means comprising a first bearing member fixedly secured in said opening and slidably engaging said piston rod and a second bearing member fixedly secured to said piston and slidably engaging said inner wall of said housing means.

* * * * *